July 24, 1934.   J. G. SWAIN   1,968,005
WHEEL AND BRAKE
Filed May 25, 1929   2 Sheets-Sheet 2
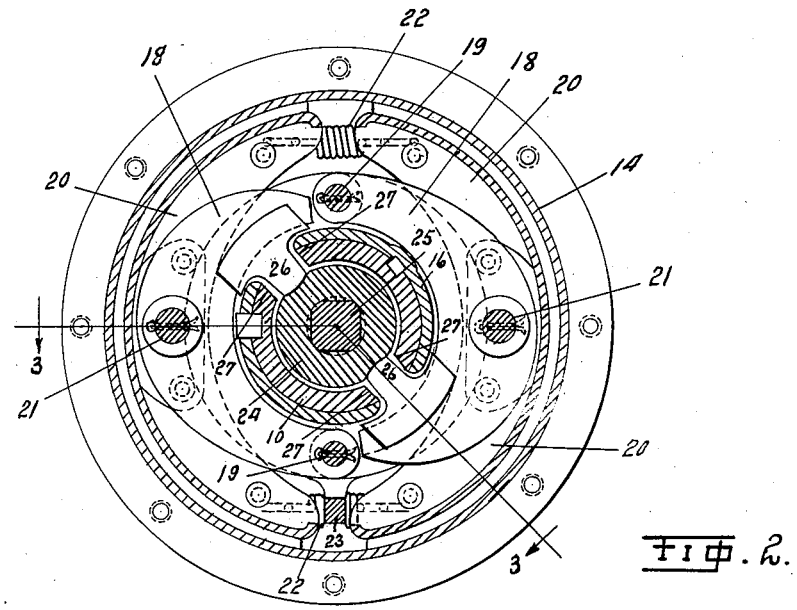
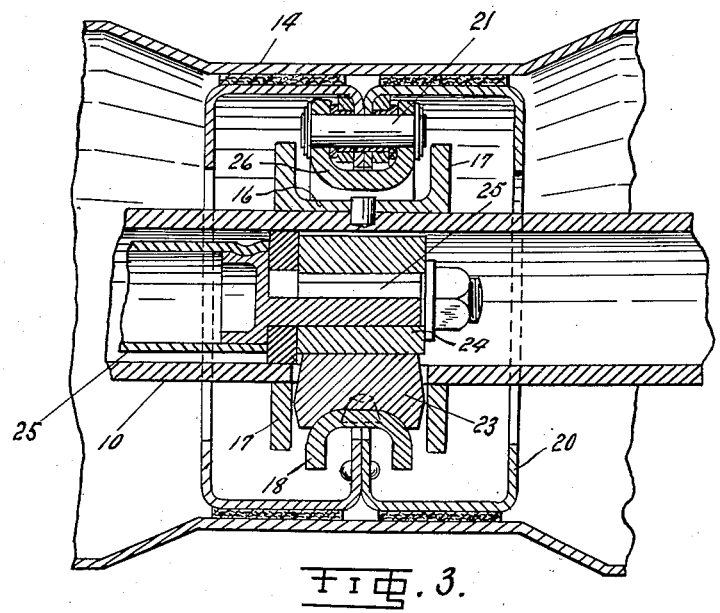
INVENTOR.
JOSEPH. G. SWAIN.
BY Ely Barrow
ATTORNEYS.

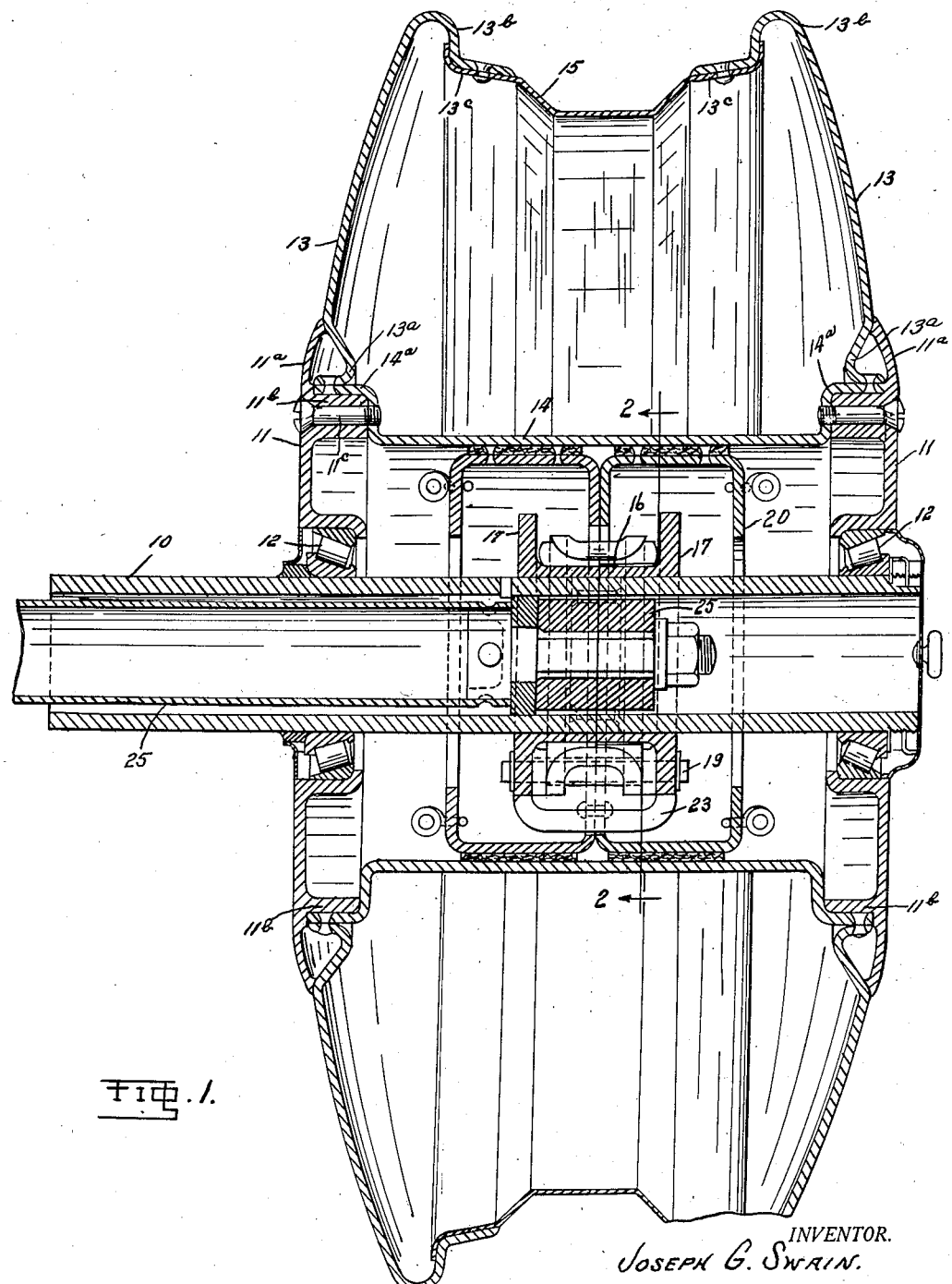

Patented July 24, 1934

1,968,005

UNITED STATES PATENT OFFICE 1,968,005

WHEEL AND BRAKE

Joseph G. Swain, Akron, Ohio, assignor to The Firestone Steel Products Company, Akron, Ohio, a corporation of Ohio Application May 25, 1929, Serial No. 365,914

7 Claims. (Cl. 188—18)

This invention relates to wheels and brakes and particularly to airplane wheels and brake structures.

The general purpose of the invention is to provide a stream line wheel with brake mechanism entirely enclosed, the brake mechanism being non-self-energizing so that it cannot lock or chatter when engaging the brake drum.

The foregoing and other purposes of the invention are attained in the modification thereof shown in the accompanying drawings and described below. It is to be understood that the invention is not limited to the specific form thereof shown and described.

Of the accompanying drawings,

Figure 1 is a diametral section through a wheel and brake structure embodying the invention;

Figure 2 is a section on line 2—2 of Figure 1; and

Figure 3 is a section on line 3—3 of Figure 2.

Referring to the drawings, the numeral 10 designates a hollow axle and the numerals 11, 11 hub members journaled thereon as by roller bearings 12, 12. The hub members 11 are provided with convex radial flanges 11a and a wheel structure including convex radial flanges 13, a hub sleeve 14 and a run 15 is secured between said hub members.

The flanges 13 cooperate with the flanges 11a to maintain a stream line construction for the outer faces of the wheel and inwardly of the hub flanges 11a. The flanges 13 are bent inwardly and then axially to provide axial flanges 13a which may be riveted or otherwise secured to radially expanded flanges 14a on the hub sleeve 14 fitting onto the peripheral flanges 11b of the hubs 11 to which the wheel structure may be secured as by axial screws 11c.

The outer portions of flanges 13b are curved inwardly both axially and radially of the wheel to provide tire retaining flanges and are extending inwardly toward each other at 13c to form tire bead seats, a rim member 15 preferably of the drop center type being secured between said seats as by being riveted thereto.

The hub sleeve 14 constitutes a brake drum and housing for a brake structure mounted on axle 10. This brake structure includes a collar 16 secured onto axle 10 and having radial flanges 17, 17 at its ends between which are pivoted rocker arms 18, 18 on pins 19, 19. The rocker arms 18 have brake shoes 20, 20 pivoted thereto at 21, 21, said brake shoes being connected together at their adjacent ends by springs 22, 22 tending to hold the brake collapsed and to maintain the shoes substantially concentric of the brake at all times. A bar 23 preferably formed integral with the collar 16 and spanning its flanges between adjacent ends of brake shoes 20 limits contraction of the brake.

To actuate the brake a cam 24 is secured on a shaft 25 in axle 10 and studs 26 on the inner sides of rocker arms 18 extend through apertures 27, through collar 16 and axle 10 into engagement with cam 24. Shaft 25 may be rotated from the cock pit of an airplane by suitable means (not shown).

It will be apparent that the brake shoes 20 operate bodily radially into engagement with the hub sleeve 14, and that they accordingly cannot lock or chatter, locking or chattering of airplane brakes being of serious consequence in that such action may cause the ship to tip.

Modification of the invention may be resorted to without departing from the spirit thereof or the scope of the appended claims.

What is claimed is:

1. A wheel and brake construction including a hollow axle, a wheel formed with a hub sleeve mounted on said axle, and an expanding type brake housed in and cooperating with said hub sleeve, said brake including a pair of rocker arms, a pair of opposite brake shoes pivoted on the rocker arms, springs connecting adjacent ends of the shoes to contract the brake, means extending between the brake shoes for limiting contraction of the brake, and means for expanding the brake including a rotatable cam in the axle and studs on the rocker arms extending into the axle into engagement with the cam.

2. A wheel and brake construction including a hollow axle, a wheel formed with a hub sleeve mounted on said axle, and an expanding type brake housed in and cooperating with said hub sleeve, said brake including a pair of rocker arms, a pair of opposite brake shoes pivoted on the rocker arms, springs connecting adjacent ends of the shoes to contract the brake, and means for expanding the brake including a rotatable cam in the axle and studs on the rocker arms extending into the axle into engagement with the cam.

3. The combination with a wheel including a hub sleeve, of a hollow axle for mounting said wheel, a brake mounted on the axle and housed in and cooperating with the hub sleeve, and means housed in the axle for cooperating with and expanding the brake.

4. In a wheel a brake construction including a hollow axle, a hub sleeve mounted on said axle, and an expanding type brake housed in and cooperating with said hub sleeve, said brake including a pair of rocker arms, a pair of opposite brake shoes pivoted on the rocker arms, springs connecting adjacent ends of the shoes to contract the brake, means extending between the brake shoes for limiting contraction of the brake, and means for expanding the brake including a rotatable cam in the axle and studs on the rocker arms extending into the axle into engagement with the cam.

5. In a wheel a brake construction including a hollow axle, a hub sleeve mounted on said axle, and an expanding type brake housed in and cooperating with said hub sleeve, said brake including a pair of rocker arms, a pair of opposite brake shoes pivoted on the rocker arms, springs connecting adjacent ends of the shoes to contract the brake, and means for expanding the brake including a rotatable cam in the axle and studs on the rocker arms extending into the axle into engagement with the cam.

6. In a brake assembly, the combination with an axle having a tubular axially extending portion and a wheel hub mounted upon the tubular portion in spaced relation thereto, of a braking element encircling the tubular portion of the axle within the hub and having a brake lining thereon frictionally engageable with the inner surface of the latter, and means housed within the said tubular portion for actuating said braking element to engage the latter with the hub.

7. In a brake assembly, the combination with an axle, a wheel hub mounted upon said axle and having a tubular portion encircling the axle in spaced relation thereto, of a braking element located within the space between the axle and tubular portion aforesaid for frictionally engaging the inner surface of the latter, and means located within said axle and operatively connected to said braking element for actuating the latter to engage the same with the hub.

JOSEPH G. SWAIN.